United States Patent
Neil (10) Patent No.: US 8,934,409 B2
(45) Date of Patent: Jan. 13, 2015

(54) METHOD AND APPARATUS FOR ENABLING ACCESS TO A PACKET DATA NETWORK

(75) Inventor: David Neil, Cambridge (GB)

(73) Assignee: IP.Access Limted, Cambrideshire (GB)

( * ) Notice: Subject to any disclaimer, the term of this patent is extended or adjusted under 35 U.S.C. 154(b) by 213 days.

(21) Appl. No.: 13/145,587

(22) PCT Filed: Jan. 5, 2010

(86) PCT No.: PCT/EP2010/000017
§ 371 (c)(1),
(2), (4) Date: Sep. 16, 2011

(87) PCT Pub. No.: WO2010/083939
PCT Pub. Date: Jul. 29, 2010

(65) Prior Publication Data
US 2011/0317623 A1    Dec. 29, 2011

(30) Foreign Application Priority Data
Jan. 23, 2009    (GB) .................................. 0901073.7

(51) Int. Cl.
*H04W 4/00* (2009.01)
*G01R 31/08* (2006.01)
*H04B 7/00* (2006.01)
(Continued)

(52) U.S. Cl.
CPC ......... *H04W 76/022* (2013.01); *H04L 12/5602* (2013.01); *H04L 47/10* (2013.01); *H04W 84/12* (2013.01); *H04W 80/04* (2013.01); *H04L 29/06163* (2013.01); *H04L 5/14* (2013.01); *H04W 84/045* (2013.01); *H04W 88/16* (2013.01)

USPC ............ 370/328; 370/232; 370/277; 370/465

(58) Field of Classification Search
CPC ....... H04L 47/10; H04L 12/5602; H04L 5/14; H04L 29/06163; H04W 80/04; H04W 84/12
USPC ........................................................... 370/328
See application file for complete search history.

(56) References Cited

U.S. PATENT DOCUMENTS

2007/0025329 A1 * 2/2007 Chen .............................. 370/352
2008/0117879 A1 * 5/2008 Wu et al. ....................... 370/332
(Continued)

FOREIGN PATENT DOCUMENTS

EP    1881660    12/2006
EP    1916803    10/2007

OTHER PUBLICATIONS

Chinese Patent Application No. 201080013034.4; Notification of the First Office Action Dated Sep. 3, 2013 (with translation.
(Continued)

*Primary Examiner* — Faruk Hamza
*Assistant Examiner* — Abu-Sayeed Haque
(74) *Attorney, Agent, or Firm* — Fitch Even Tabin & Flannery LLP (57) ABSTRACT

A network element for a cellular communication network comprises gateway router logic. The gateway router logic is arranged to receive a request to create a packet data context for enabling a mobile communication device to access a packet data network; obtain an address for a gateway logic module for the packet data network, the gateway logic module being located within a femto radio network subsystem; and forward the request to create a packet data context to the obtained address for the gateway logic module.

18 Claims, 3 Drawing Sheets

(51) Int. Cl.
  *H04J 3/16* (2006.01)
  *H04W 76/02* (2009.01)
  *H04L 12/54* (2013.01)
  *H04L 12/801* (2013.01)
  *H04W 84/12* (2009.01)
  *H04W 80/04* (2009.01)
  *H04L 29/06* (2006.01)
  *H04L 5/14* (2006.01)
  *H04W 84/04* (2009.01)
  *H04W 88/16* (2009.01)

(56) References Cited

U.S. PATENT DOCUMENTS

2008/0165702 A1* 7/2008 Bienas et al. .............. 370/254
2009/0129342 A1* 5/2009 Hwang et al. .............. 370/331
2009/0245202 A1* 10/2009 Gras et al. ................. 370/331
2010/0291933 A1* 11/2010 Choi et al. ................. 455/436

OTHER PUBLICATIONS

1. Nortel: LTE Local Breakout for Home eNB 3GPP Draft: R-3-081247_INTHENB_10.1.2A_LTEHENBDEP.REV0, 3rd Generation Partnership Project (3GPP), Mobile Competence Centre; 650, Route Des Lucioles; F-06921 Sophia-Antipolis Cedex; France, vol. RAN WG3, No. Kansas City, USA; 20080430, Apr. 30, 2008.
2. 3GPP TEchnical Specification 24.008; 3GPP TS 214.008 V3.20.0 (Dec. 2005); 3rd Generation Partnership Project; Technical Specification Group Core Network; Mobile Radio Interface Layer 3 Specification; Core Network Protocols; Stage 3 (Release 1999).
British Patent Application No. GB0901073.7; Search Report Under Section 17; Dated May 13, 2009.
PCT Patent Application No. PCT/EP2010/000017; International Preliminary Report on Patentability; Dated: Jul. 26, 2011.

* cited by examiner

METHOD AND APPARATUS FOR ENABLING ACCESS TO A PACKET DATA NETWORK

CROSS REFERENCE TO RELATED APPLICATIONS

This application is a national phase application of International Application No. PCT/EP2010/000017, filed Jan. 5, 2010, claiming priority to Great Britain Application No. 0901073.7, filed Jan. 23, 2009, both of which are incorporated by reference herein in their entirety.

FIELD OF THE INVENTION

The field of the invention relates to a method and apparatus for enabling access to a packet data network, and in particular, to a network element comprising gateway router logic, a cellular communication system comprising such a network element, and a method therefor.

BACKGROUND OF THE INVENTION

Wireless communication systems, such as the $3^{rd}$ Generation (3G) of mobile telephone standards and technology, are well known. An example of such 3G standards and technology is the Universal Mobile Telecommunications System (UMTS), developed by the $3^{rd}$ Generation Partnership Project (3GPP) (www.3gpp.org). The $3^{rd}$ generation of wireless communications has generally been developed to support macro-cell mobile phone communications. Such macro cells utilise high power base stations (Node Bs in 3GPP parlance) to communicate with remote (often mobile/portable) wireless Communication units within a relatively large coverage area. Typically, wireless communication units, or User Equipment (UE) as they are often referred to in 3G parlance, communicate with a Core Network (CN) of the 3G wireless communication system via a Radio Network Subsystem (RNS). A wireless communication system typically comprises a plurality of radio network subsystems, each radio network subsystem comprising one or more cells to which UEs may attach, and thereby connect to the network. Each macro-cellular RNS further comprises a controller, in the form of a Radio Network Controller (RNC), operably coupled to the one or more Node Bs, via an Iub interface.

The RNC is operably coupled to a Serving GPRS (General Packet Radio Service) Support Node (SGSN) within the core network via an Iu interface. The SGSN is operably coupled to a Gateway GPRS Support Node (GGSN), also located within the core network, via a Gn interface. The GGSN provides an interface Gi between the backbone GPRS network and external packet data networks, such as the Internet.

In order for a UE to access, say, the Internet via the 3G wireless communication system, the UE must activate a PDP (Packet Data Protocol) context. A PDP context is a data structure present on both the current SGSN for that UE, and a GGSN that provides access to the required external packet data network, which for this example comprises the Internet.

To activate a PDP context, the UE selects an Access Point Name (APN) corresponding to the required external packet data network, (e.g. the Internet). The selection of the APN may be based on configuration information or by user input. The UE then sends a GPRS session management message in the form of an Activate PDP Context Request message comprising the APN to the SGSN. Further details for GPRS management messages may be found in 3GPP Technical Specification 24.008.

Upon receipt of the Activate PDP Context Request message, the SGSN performs a DNS (Domain Name Server) lookup for the APN, in order to locate the address of the appropriate GGSN. The SGSN then initiates PDP context activation within itself and the appropriate GGSN, and sends details of the activated PDP context to the UE. The UE is then able to access, for example, the Internet using the activated PDP context within the GGSN.

Lower power (and therefore smaller coverage area) femto cells (or pico-cells) are a recent development within the field of wireless cellular communication systems. Femto cells or pico-cells (with the term femto cells being used hereafter to also encompass pico-cells or similar) are effectively communication coverage areas supported by low power base stations (otherwise referred to as Access Points (APs)). These femto cells are intended to be able to be piggy-backed onto the more widely used macro-cellular network and support communications to UEs in a restricted, for example 'in-building', environment.

In this regard, a femto cell that is intended to support communications according to the 3GPP standard will hereinafter be referred to as a 3G femto cell. Similarly, an access controller intended to support communications with a low power base station in a femto cell according to the 3GPP standard will hereinafter be referred to as a $3^{rd}$ generation access controller (3G AC). Similarly, an Access Point intended to support communications in a femto cell according to the 3GPP standard will hereinafter be referred to as a $3^{rd}$ Generation Access Point (3G AP).

Typical applications for such 3G APs include, by way of example, residential and commercial (e.g. office) locations, communication 'hotspots', etc., whereby an AP can be connected to a core network via, for example, the Internet using a broadband connection or the like. In this manner, femto cells can be provided in a simple, scalable deployment in specific in-building locations where, for example, network congestion at the macro-cell level may be problematic.

In a femto cell scenario, an RNS typically comprises multiple 3G Access Points (3G AP), performing a number of functions generally associated with a base station or Node B and a controller in a form of a 3G Access controller (3G AC). The 3G AP is typically coupled to the 3G Access Controller via the Internet. The 3G Access Controller is then typically coupled to the core network (CN) via an Iu interface. In this manner, the 3G AP is able to provide voice and data services to a cellular handset, such as a UE, in a femto cell in contrast to the macro cell, in the same way as a conventional Node-B, but with the deployment simplicity of, for example, a Wireless Local Area Network (WLAN) access point.

Conventionally, in order for a UE within a femto cell to access, say, the Internet via the 3G wireless communication system, the UE must activate a PDP context within the SGSN and GGSN, and access the Internet (or other external packet data network) via the appropriate GGSN of the core network. Accordingly, data being uploaded from the UE to the Internet is sent via the 3G AP over the Internet to the 3G Access Controller, before being routed via the SGSN and GGSN back to the Internet. Similarly, data being downloaded from the Internet is routed via the GGSN and SGSN to the 3G Access Controller, where it is transmitted over the Internet to the 3G AP.

As will be appreciated by a skilled artisan, this current approach for accessing the Internet and other external packet data networks via femto cells is inefficient, since typically 3G APs already have substantially direct access to the Internet. Therefore, the current technique is wasteful of network resources that could otherwise be utilised more effectively.

It is also known for local packet data networks to exist within residential and commercial environments. For example, a local network within a residential environment may comprise a home network linking, for example, a personal computer, a printer, etc. Similarly, in a commercial environment, a local network may comprise a local area network such as a corporate intranet or the like. It is contemplated that a femto AP may be operably coupled to such a local network, and enable access to such a local network. However, current approaches for accessing packet data networks via cellular communication networks such as a 3G network do not enable a UE to access such a local network via a femto AP, even if the UE is located within the femto cell supported by that femto AP.

SUMMARY OF THE INVENTION

Accordingly, the invention seeks to mitigate, alleviate or eliminate one or more of the abovementioned disadvantages, either singly or in any combination.

According to a first aspect of the invention, there is provided a network element for a cellular communication network. The network element comprises gateway router logic arranged to: receive a request to create a packet data context for enabling a mobile communication device to access a packet data network; obtain an address for a gateway logic module for the packet data network, the gateway logic module being located within a femto radio network subsystem; and forward the request to create a packet data context to the obtained address for the gateway logic module.

In this manner, the gateway router logic may be able to act as an intermediary between, say, a serving GPRS support node (SGSN) within a 3GPP cellular communication network, and one or more gateway logic modules. As a result, the gateway router logic may substantially alleviate the need for the serving GPRS support node to support significantly large numbers of gateway interfaces for packet data networks. The gateway router logic may also alleviate the need for the serving support node to be capable of the required networking in order to communicate directly with femto access points, for example using a security gateway to bypass any firewalls and NATs (Network Address Translations), for example that may be present between a femto AP and the Internet, in order to create the required packet data contexts within the gateway logic modules of the femto access points. Significantly, the use of such gateway router logic may facilitate the implementation of gateway interface functionality within the femto access points in order to improve the efficiency of accessing the Internet and other packet data networks via femto cells, and may alleviate the need for significant alteration or changes to conventional serving GPRS support nodes and the like. Furthermore, the gateway router logic may further alleviate the need to provide numerous serving support nodes with sufficient information to enable them to identify specific gateway interfaces from a request to activate a packet data context. Instead, such information need only be made available to the gateway router logic.

According to a second aspect of the invention, there is provided a cellular communication system comprising the network element of the first aspect of the invention.

According to a third aspect of the invention, there is provided a method for enabling a mobile communication device to access a packet data network. The method comprises: receiving a request to create a packet data context for enabling a mobile communication device to access a packet data network; obtaining an address for a gateway logic module for the packet data network, the gateway logic module being located within a femto radio network subsystem; and forwarding the request to create a packet data context to the obtained address for the gateway logic module.

According to a fourth aspect of the invention, there is provided a computer-readable storage element having computer-readable code stored thereon for programming a signal processing logic module in accordance with the aforementioned method of the third aspect of the invention.

These and other aspects, features and advantages of the invention will be apparent from, and elucidated with reference to, the embodiments described hereinafter.

BRIEF DESCRIPTION OF THE DRAWINGS

Embodiments of the invention will be described, by way of example only, with reference to the accompanying drawings, in which.

DETAILED DESCRIPTION OF EMBODIMENTS OF THE INVENTION

One approach for improving the efficiency of accessing the Internet and other external packet data networks via femto cells is to incorporate GGSN functionality within the 3G AP. In this manner, when a UE within a femto cell requests access to, say, the Internet, a PDP context may be created within the GGSN functionality of the 3G AP, enabling the UE to access the Internet substantially directly via the 3G AP rather than via the GGSN of the core network.

Whilst this approach is more economical with respect to network resources, conventional network elements such as SGSNs may not be suitable for such an implementation. In particular, whilst conventional SGSNs may be designed to support large numbers of RNCs, they are not designed to support large numbers of GGSNs, and in particular are typically not designed to be scalable in this manner. In addition, conventional SGSNs may not be capable of the required networking in order to communicate with femto APs, for example by way of a security gateway. Furthermore, conventional SGSNs may not have sufficient information to enable them to identify the appropriate GGSN, for example a GGSN within a 3G AP, from an Activate PDP Context Request message.

Figure 1:
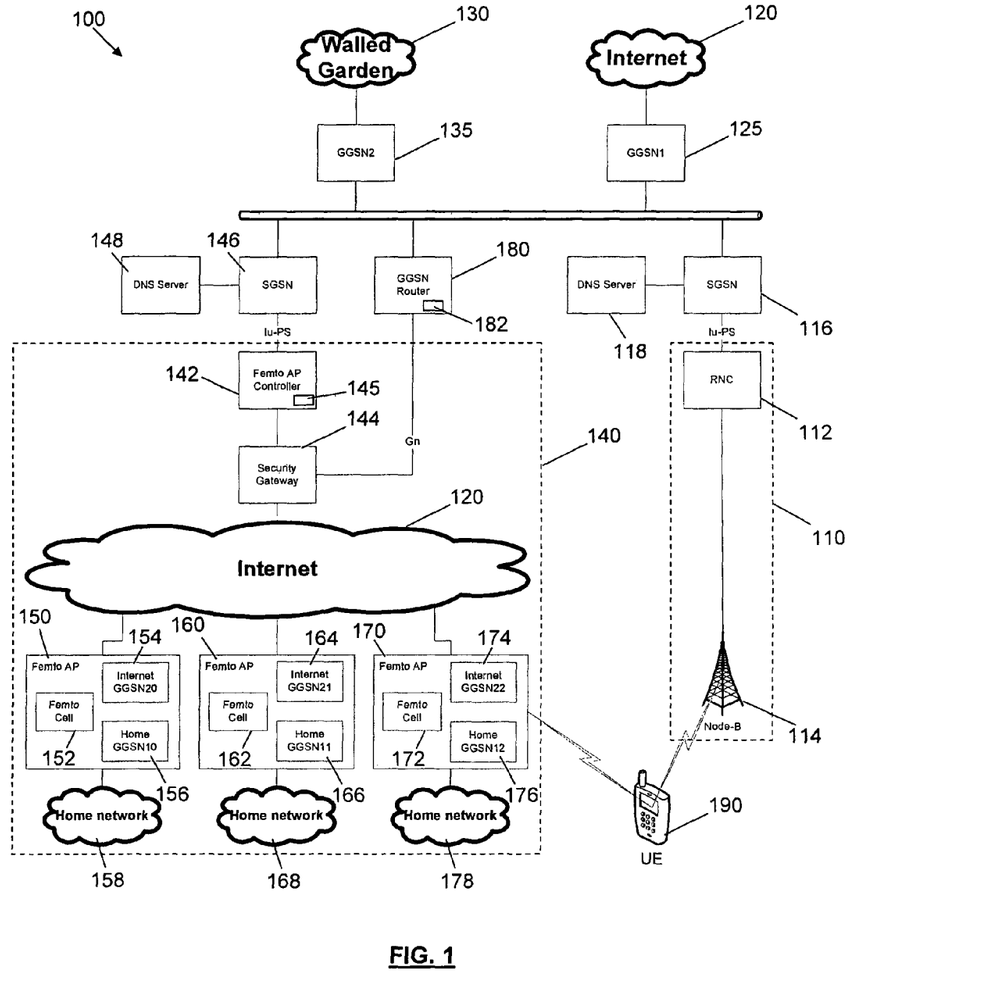
FIG. 1 illustrates an example of part of a cellular communication network adapted in accordance with some embodiments of the invention.

Referring now to the drawings, and in particular to FIG. 1, an example of part of a cellular communication network, such as a 3GPP network, adapted in accordance with an embodiment of the invention, is illustrated and indicated generally at 100. In particular, there is illustrated an example of part of a cellular communication network 100 that comprises a combination of macro cells and 3G femto cells. In FIG. 1 there is illustrated a first radio network sub-system (RNS) 110 comprising an architecture adapted to handle macro cell communications, and a second radio network sub-system 140 comprising architecture adapted to handle femto cell communications.

For the illustrated femto cell scenario, the femto RNS 140 comprises a plurality of femto Access Points (APs) 150, 160, 170 performing a number of functions generally associated with a base station or Node B, and a controller in a form of a femto access controller 142. As will be appreciated by a skilled artisan, a femto access point, such as a 3G access point (AP), is a communication element comprising air interface controller 152, 162, 172 for supporting communications within a communication cell, such as a 3G femto cell (not shown), and as such provides access to the cellular communication network via such a femto cell. In this manner, the air interface controller 152, 162, 172 of each femto AP 150, 160, 170 is arranged to enable communication with one or more wireless communication devices located within the general vicinity of the femto AP 150, 160, 170, such as User Equipment (UE) 190, via a wireless interface (Uu). One envisaged application is that a femto AP may be purchased by a member of the public and installed in their home or office. The femto AP may then be connected to a femto access controller 142 over a packet data network, such as the Internet 120.

Thus, a femto AP may be considered as encompassing a scalable, multi-channel, two-way communication device that may be provided within, say, residential and commercial (e.g. office) locations, 'hotspots' etc, to extend or improve upon network coverage within those locations. Although there are no standard criteria for the functional components of a femto AP, an example of a typical femto AP for use within a 3GPP system may comprise some Node-B functionality and some aspects of a typical radio network controller (RNC) functionality within a macro cell architecture.

The femto access controller 142 is coupled to a Serving GPRS (General Packet Radio Service) Support Node (SGSN) 146 of the core network (CN) via an Iu interface, as shown. Furthermore, the femto access controller 142 is operably coupled to, for the illustrated embodiment, the Internet 120 via security gateway 144, enabling communication between the femto access controller 142 and each of the femto APs 150, 160, 170 via the Internet 120. In this manner, each femto AP 150, 160, 170 is able to provide voice and data services to a wireless communication device, such as UE 190, located within its respective femto cell (not shown), in the same way as a conventional macro cell Node-B, but with the deployment simplicity of, for example, a Wireless Local Area Network (WLAN) access point.

In the illustrated macro cell scenario, the RNS 110 comprises one or more Radio Network Controllers (RNCs) 112 and one or more macro cell base station transceivers, or Node Bs in 3G parlance, 114. The one or more RNCs 112 within the macro RNS 110 is/are also coupled to an SGSN 116 of the core network via an Iu interface.

Thus, for the example illustrated in FIG. 1, in a scenario where the UE 190 is located within a macro cell supported by macro RNS 110, and requires access to, say, the Internet 120, the UE 190 may send a request for a packet data context to be activated to the core network. The request comprises an indication of the packet data network for which access is required, for example in a form of an appropriate APN for the Internet 120. The NodeB 114 forwards the request on to the RNC 112, which in turns forwards the request on to the SGSN 116 to which it is coupled. Upon receipt of the request, the SGSN 116 performs a DNS (Domain Name Server) lookup for the APN to locate an address for the appropriate gateway interface for the Internet 120, which for the illustrated embodiment comprises GGSN 125. Having located the required gateway address, the SGSN 116 generates a request for a packet data context creation, which it sends to, in this example, GGSN 125. Assuming the packet data context creation is successful, the SGSN 116 subsequently passes data and signalling relating to the created packet data context between the UE 190 and GGSN 125.

Similarly, in a scenario where the UE 190 is once again located within a macro cell supported by RNS 110, but requires access to a packet data network such as a 'Walled Garden' network 130 available via the core network, the UE 190 may also send a request for a packet data context to be activated to the core network comprising an appropriate APN for the walled garden network 130. As will be appreciated by a skilled artisan, a 'walled garden' network may comprise a closed set or exclusive set of information services provided to users, in contrast to, for example, providing consumers access to the open Internet for content and e-commerce. A walled garden network is often used by interactive television providers and mobile telephone network operators. Upon receipt of the request, the SGSN 116 performs a DNS (Domain Name Server) lookup for the APN to locate an address for the appropriate gateway interface for the walled garden network 130, which for the illustrated embodiment comprises GGSN 135. Having located the required gateway address, the SGSN 116 generates a request for a packet data context creation which it sends to, in this example, GGSN 135. Assuming the creation of the packet data context is successful, the SGSN 116 subsequently passes data and signalling relating to the created packet data context between the UE 190 and GGSN 135.

As previously mentioned, an approach for improving the efficiency of accessing the Internet and other packet data networks via femto cells may be to incorporate gateway interface functionality within the femto APs. Thus, for the illustrated embodiment, each of the femto APs 150, 160, 170 may further comprise a first gateway logic module 154, 164, 174, arranged to provide a gateway interface between wireless communication devices within the femto cell of the respective femto AP 150, 160, 170, and a packet data network, for example in the form of the Internet 120. In this manner, when a wireless communication device, such as UE 190, located within a femto cell requests access to, say, the Internet 120, a packet data context may be created within the gateway logic module 154, 164, 174 of the appropriate femto AP 150, 160, 170, thereby enabling the UE 190 to access the Internet 120 substantially directly via the appropriate femto AP 150, 160, 170 rather than via the core network.

As also previously mentioned, a problem with the implementation of such an approach is that within a conventional 3GPP network, SGSNs are required to resolve the addresses for the packet data network gateway interfaces such as GGSNs, for example by way of a DNS (Domain Name Server) lookup procedure. However, conventional network elements, such as SGSNs, may not be suitable for such an implementation. In particular, whilst conventional SGSNs may be designed to support large numbers of RNCs, for example numbering in the hundreds, they are not designed to support correspondingly large numbers of gateway interfaces for packet data networks, and in particular are not designed to be scalable in this manner. In addition, conventional SGSNs may not be capable of the required networking in order to communicate directly with femto APs, for example having access to a security gateway to get securely through firewalls and NATs (Network Address Translations), in order to create the required packet data contexts. Furthermore, conventional SGSNs may not have sufficient information to enable them to identify a specific gateway interface, for example a gateway interface within a femto AP, from an Activate PDP Context Request message.

Accordingly, for the illustrated embodiment the cellular communication network 100 comprises network element 180, which in turn comprises gateway router logic 182. The gateway router logic 182 is arranged to receive, for example from a serving support node such as SGSN 146, a request to create a packet data context for enabling a mobile communication device such as UE 190 to access a packet data network, such as the Internet 120. The gateway router logic 182 is further arranged to obtain an address for a gateway logic module for the packet data network, and to forward the request to create a packet data context to the obtained address for the gateway logic module. In particular, and as explained below in greater detail, the gateway router logic 182 is arranged to obtain an address for a gateway logic module located within a femto radio network sub-system, such as one of the gateway logic modules 154, 164, 174 within the femto APs 150, 160, 170.

In this manner, the gateway router logic 182 is able to act as an intermediary between, say, a serving support node, such as SGSN 146, and one or more gateway logic modules, such as gateway logic modules 154, 164, 174. As a result, the gateway router logic 182 may substantially alleviate the need for the SGSN 146 to support significantly large numbers of gateway interfaces for packet data networks. In addition, the gateway router logic 182 may also alleviate the need for the SGSN 146 to be capable of the required networking in order to communicate directly with femto APs, for example by way of having access to a security gateway for the Internet, in order to create the required packet data contexts within the gateway logic modules of the femto APs. Significantly, the use of such gateway router logic 182 may facilitate the implementation of gateway interface functionality within the femto APs in order to improve the efficiency of accessing the Internet and other packet data networks via femto cells. Advantageously, the use of gateway router logic 182 may substantially alleviate the need for significant alterations or changes to conventional SGSNs and the like. Furthermore, the gateway router logic 182 may further alleviate the need to provide numerous SGSNs with sufficient information to enable them to identify specific gateway interfaces from an Activate PDP Context Request message. Instead, such information need only be made available to the gateway router logic 182.

The gateway router logic 182 will now be described in greater detail in relation to various scenarios in which a wireless communication device, which for the illustrated examples comprises UE 190, requires access to a packet data network.

In a first scenario, the UE 190 is located within a femto cell, for example supported by one of the femto APs 150, 160, 170, and requires access to, say, the Internet 120. The UE 190 sends to the core network a request for a packet data context to be activated. The request comprises an indication of the packet data network for which access is required, for example in a form of an appropriate APN for the Internet 120. The request is received by the relevant femto AP 150, 160, 170, which forwards the request on to the femto access controller 142 via the security gateway 144. The femto access controller 142 then, in turn, forwards the request on to the SGSN 146.

Upon receipt of the request for a packet data context to be activated, the SGSN 146 performs a DNS lookup operation for example by way of DNS server 148, for the APN identified within the request in order to locate an appropriate address to which to send a request to create a packet data context. In accordance with the illustrated embodiment, the DNS lookup operation performed by the SGSN 146 in this scenario returns an address corresponding to the gateway router logic 182. Accordingly, the SGSN subsequently generates and sends a request to create a packet data context to the gateway router logic 182.

The gateway router logic 182 receives the request to create a packet data context from the SGSN 146, and obtains an address for a gateway logic module within the appropriate femto AP 150, 160, 170 for the required packet data network, which for the current scenario is the Internet 120. For example, if the UE 190 is located within the femto cell supported by femto AP 150, the gateway router logic 182 obtains the address for the gateway logic module 154 of femto AP 150.

Having located the required gateway address, the gateway router logic 182 forwards the request for a packet data context creation to, in this example, the gateway logic module 154 for the Internet 120 of femto AP 150. For the illustrated embodiment, the gateway router logic 182 is operably coupled to the security gateway 144, and thus is able to simply forward the request to the gateway logic module 154 via the security gateway 144.

In this manner, when located within a femto cell, the UE 190 is able to establish a packet data context for use in accessing the Internet via the gateway logic module 154, 164, 174 for the Internet 120 of the respective femto AP 150, 160, 170.

In accordance with some embodiments of the invention it is envisaged that the request to create a packet data context received by the gateway router logic 182 may comprise an APN that is substantially unique to the required gateway logic module 154, 164, 174. For example, a conventional APN information element typically comprises one or more labels separated by dots, such as:

service.operator.com where: 'service' may comprise a value of 'web', 'wap', 'email', etc., and 'operator' may comprise the name of the network operator to which the wireless communication unit is subscribed (e.g. Vodaphone™, O2™, T-Mobile™, Orange™, Virgin™, etc.). The APN can be resolved, for example using DNS functionality, to provide an IP address of, say, an appropriate GGSN for accessing the required service. However, it is contemplated that a more specific, and substantially unique APN may be used to identify the specific required gateway logic module 154, 164, 174. For example, the APN may comprise:

service.<apserial>.femto.operator.com where the APN is modified to include the '<apserial>' label, as well as a generic 'femto' label. In this manner, not only does the APN indicate the required external packet data network (in the 'service' label), but also provides an indication of a specific femto AP via which access is requested (in the '<apserial>' label). Thus, the APN may be resolved, for example by way of a DNS lookup, to obtain the address of the appropriate gateway logic module 154, 164, 174 within the appropriate femto AP 150, 160, 170.

In accordance with an alternative embodiment of the invention, it is envisaged that the request to create a packet data context received by the gateway router logic 182 may comprise a more general, or common APN. For example, the APN may comprise a conventional APN information element as mentioned above, or an APN comprising a generic femto label such as:

service.femto.operator.com where: the APN comprises a generic label 'femto', thereby indicating that the required access point for the external packet data network is located within a femto AP. As will be appreciated, such an APN comprises insufficient information to enable a specific femto AP 150, 160, 170, or more specifically a specific gateway logic module 154, 164, 174 to be identified. In order for the gateway router logic 182 to be able to identify an appropriate gateway logic module 154, 164, 174, and thus to obtain the address for the appropriate gateway logic module 154, 164, 174, the gateway router logic 182 may be arranged to extract an identifier for the UE 190, such as the International Mobile Subscriber Identity (IMSI) number, from the received request to create a packet data context.

As will be appreciated by a skilled artisan, typically a femto AP is privately owned, whether by a commercial entity such as a business or by a household/family. Accordingly, in order to restrict access to a network via a femto AP, identifiers of wireless communication devices, such as their IMSIs, may be associated with specific femto APs. In this manner, access via a femto AP may be restricted to those devices whose identifiers are associated therewith. It is therefore contemplated that, once the gateway router logic 182 has extracted the identifier for the UE 190, it is able to determine which femto AP 150, 160, 170 the UE 190 is associated with, and is thereby able deduce which gateway logic module 154, 164, 174 is required to create the packet data context. Having identified the appropriate gateway logic module 154, 164, 174, the gateway router logic 182 is able to obtain the address therefor, for example by way of a DNS lookup operation or some other method, such as using a database or the like.

As previously mentioned, upon receipt of the request, the SGSN 146 performs a DNS lookup operation for the APN within the request to locate an appropriate address to which to send the request to create a packet data context. In the examples described above, the DNS lookup operation may be configured such that, for any APN comprising the 'femto' label, the address for the gateway router logic 182 is returned. In this manner, the SGSN 146 is caused to send the request to create a packet data context to the gateway router logic 182 of the network element. Alternatively, where the SGSN 146 is arranged to support only femto radio network sub-systems, the DNS lookup operation may be configured to return the address for the gateway router logic 182 for specific services that relate to packet data networks available via the femto APs, such as the Internet 120 or local networks, such as home network 158, 168, 178. Conversely, for other services, such as those relating to the walled garden network 130 of the illustrated embodiment, the DNS lookup operation may be configured to return the address of the appropriate gateway interface, namely GGSN 135 for the illustrated embodiment.

In accordance with an embodiment of the invention, having forwarded a received request to create a packet data context to a gateway logic module, the gateway router logic 182 is arranged to route subsequently received signalling and data associated with the request to create a packet data context between the serving node, such as SGSN 146, and the gateway logic module to which the request was forwarded. For the illustrated embodiment, the transmission and reception of signalling and data to and from the gateway logic module is achieved via the security gateway 144. In particular for some embodiments of the invention, it is envisaged that the gateway router logic 182 may be adopted to be substantially transparent to serving support nodes from which it receives requests, and to gateway logic modules to which it forwards requests. For example, the gateway router logic 182 may appear to an SGSN as comprising a GGSN or at least some functionality of a GGSN, and appear to a GGSN as comprising an SGSN. In this manner, the gateway router logic 182 is capable of operating with conventional SGSNs and GGSNs.

In the case where a wireless communication device, such as UE 190, is accessing the cellular communication network 100 via a femto AP 150, 160, 170, the SGSN 146 and the gateway router logic 182 may be arranged to create a substantially direct tunnel, or 'one-tunnel' between the air interface controller 152, 162, 172 and the gateway logic module 154, 164, 174 of the respective femto AP 150, 160, 170.

As defined in 3GPP TR 23.919, a direct tunnel (previously referred to as a one-tunnel approach) allows an SGSN, and in the case of embodiments of the invention the gateway router logic 182, to establish a direct user plane tunnel between a Radio Access Network (RAN) and a gateway interface, such as a GGSN, within the packet switched domain. Thus, for embodiments of the invention, a direct tunnel may be established between the air interface controller 152, 162, 172, forming part of the RAN, and the gateway logic module 154, 164, 174 of the respective femto AP 150, 160, 170. The gateway router logic 182 and the SGSN 146 may handle the control plane signalling and make the decision as to when to establish a direct tunnel. The detail procedures for establishing a direct tunnel are specified in 3GPP TS 23.060.

For the illustrated embodiment, each of the femto APs 150, 160, 170 may further comprise a second gateway logic module 156, 166, 176, arranged to provide a gateway interface between the respective femto AP 150, 160, 170, and a local packet data network in the form of home networks 158, 168, 178. Accordingly, in a second scenario, the UE 190 is located within a femto cell (not shown), for example supported by one of the femto APs 150, 160, 170, and requires access to the corresponding local network 158, 168, 178. The UE 190 sends a request for a packet data context to be activated to the core network. The request comprises an indication of the packet data network for which access is required, for example in a form of an appropriate APN for the local network 158, 168, 178. The request is received by the relevant femto AP 150, 160, 170, which forwards the request on to the femto access controller 142 via the Internet 120 and security gateway 144. The femto access controller 142 then, in turn, forwards the request on to the SGSN 146.

Upon receipt of the request, the SGSN 146 performs a DNS lookup operation for the APN within the request to locate an appropriate address to which to send a request to create a packet data context. Once again, the DNS lookup operation performed by the SGSN 146 in this scenario returns an address corresponding to the gateway router logic 182. Accordingly, the SGSN subsequently generates and sends a request to create a packet data context to the gateway router logic 182.

The gateway router logic 182 receives the request to create a packet data context from the SGSN 146, and obtains an address for a gateway logic module within the appropriate femto AP 150, 160, 170 for the required packet data network, which for the current scenario is the local network 158, 168, 178. For example, if the UE 190 is located within the femto cell supported by femto AP 150, the gateway router logic 182 obtains the address for the gateway logic module 156 for the home network 158 of femto AP 150. Having located the required gateway address, the gateway router logic 182 forwards the request for a packet data context creation to, in this example, the gateway logic module 154 for the home network 158 of femto AP 150.

In this manner, when located within a femto cell, the UE 190 is able to access a local network via the gateway logic module 156, 166, 176 for the local network 158, 168, 178 of the respective femto AP 150, 160, 170. The gateway router logic 182 may also be arranged to create a substantially direct tunnel between the air interface controller 152, 162, 172 and the gateway logic module 156, 166, 176 of the respective femto AP 150, 160, 170.

In a third scenario, the UE 190 is located within a macro cell, for example supported by the macro RNS 110. For this scenario, the UE 190 requires access to one of the local networks, say home network 158. The UE 190 sends a request for a packet data context to be activated to the core network.

The request comprises an indication of the packet data network for which access is required, for example in a form of an appropriate APN for home network 158. The request is received by Node B 114, which forwards the request on to the femto RNC 112. The RNC 112 then, in turn, forwards the request on to the SGSN 116.

Upon receipt of the request, the SGSN 116 performs a DNS lookup operation for the APN within the request to locate an appropriate address to which to send a request to create a packet data context. Once again, the DNS lookup operation performed by the SGSN 116 in this scenario returns an address corresponding to the gateway router logic 182. Accordingly, the SGSN 116 subsequently generates and sends a request to create a packet data context to the gateway router logic 182.

The gateway router logic 182 receives the request to create a packet data context from the SGSN 116, and obtains an address for a gateway logic module within the appropriate femto AP for the required packet data network, which for the current scenario is the local network 158. For example, the local network 158 may comprise a user's own home network.

Having located the required gateway address, the gateway router logic 182 forwards the request for a packet data context creation to, in this example, the gateway logic module 154 for the home network 158 of femto AP 150.

In this manner, when located within a macro cell, the UE 190 is able to access a local network via the appropriate gateway logic module 156, 166, 176 for the local network 158, 168, 178 of the respective femto AP 150, 160, 170.

Referring back to the scenario in which the UE 190 is located within a femto cell supported by one of the femto APs 150, 160, 170, and a packet data context has been created enabling the UE 190 to access a local network 158, 168, 178, as previously mentioned a substantially direct tunnel, or 'one-tunnel' may have been created between the air interface controller 152, 162, 172 and the gateway logic module 156, 166, 176 of the respective femto AP 150, 160, 170.

If the UE 190 leaves the femto cell whilst the packet data context is still active, a handover to the macro network is necessary in order to enable the UE 190 to continue to access the local network. As will be appreciated by a skilled artisan, a communication handover may occur in two different scenarios. For the first scenario, the UE 190 moves to a macro RNS supported by the same SGSN, namely SGSN 146 for the illustrated embodiment. For the second scenario, the UE 190 moves to a macro RNS supported by a different SGSN, such as the macro RNS 112 and SGSN 116 for the illustrated embodiment. In either of these two scenarios, the gateway logic module 156, 166, 176 for the local network is only peripherally involved in the handover process.

In the scenario where the UE 190 moves to a macro RNS supported by the same SGSN, such as SGSN 146 the SGSN 146 and the gateway router logic 182 first 'turn off' the direct tunnel functionality by, for example, sending a modify PDP context message to the gateway logic module 156, 166, 176, and a RAB (Radio Access Bearer) Modification message to the RAN. This causes the user data to be routed from the UE 190 to the local network 158, 168, 178 via the respective femto AP 150, 160, 170, Femto AP Controller 142, SGSN 146, gateway router logic 182, gateway logic module 156, 166, 176. Once the direct tunnel has been turned off, intra-SGSN handover can proceed as normal with no involvement of the gateway router logic 182. At the completion of the handover, the user data from the UE 190 is routed via the NodeB (supporting the macro cell to which the UE 190 has moved), the respective RNC (not shown) for that NodeB, and the SGSN 146 and gateway router logic 182, gateway logic module 156, 166, 176. In the other direction, the SGSN 146 stops routing data from the local network 158, 168, 178 to the femto AP controller 142 and starts sending it to the RNC (not shown) for the NodeB supporting the macro cell to which the UE 190 has moved.

Conversely, in the scenario where the UE 190 moves to a macro RNS supported by a different SGSN, for example SGSN 116, the gateway logic module of the local network 158, 168, 178 needs to update its routing in order to pass its data and signalling to the new SGSN, instead of the old SGSN. This routing change may be achieved in a similar manner to the handover described above where the UE 190 moves to macro cell supported by the same SGSN. In particular, this routing change may be achieved by the gateway router logic modifying its data routing such that data is sent to the new SGSN, with the gateway logic module only being aware of the direct tunnel being switched off.

For the embodiments illustrated in the accompanying drawings, and hereinbefore described, the gateway router logic 182 has been illustrated and described as forming a part of a substantially separate network element 180 to the SGSNs 116, 146. However, it is within the contemplation of the invention that the gateway router logic 182 may form a part of the same network element as, say, SGSN 146.

The gateway router logic 182 may additionally or alternatively be arranged to obtain an address for a gateway logic module 145 located within the femto access controller 142. Although the provision of a gateway logic module 145 within the femto access controller 142 does not provide the benefit of enabling access to a home network, nor provide the same efficiency with regard to accessing, say, the Internet as providing a gateway logic module within a femto AP, it does allow a reasonably efficient means of access to the Internet (as compared with more traditional techniques that for example require access to be routed through core network GGSNs). An additional benefit of locating the gateway logic module 145 within the femto access controller 142 is that it enables lawful interception of signals via the gateway logic module to be performed, which would not be possible with gateway logic modules located within femto APs.

Figure 2:
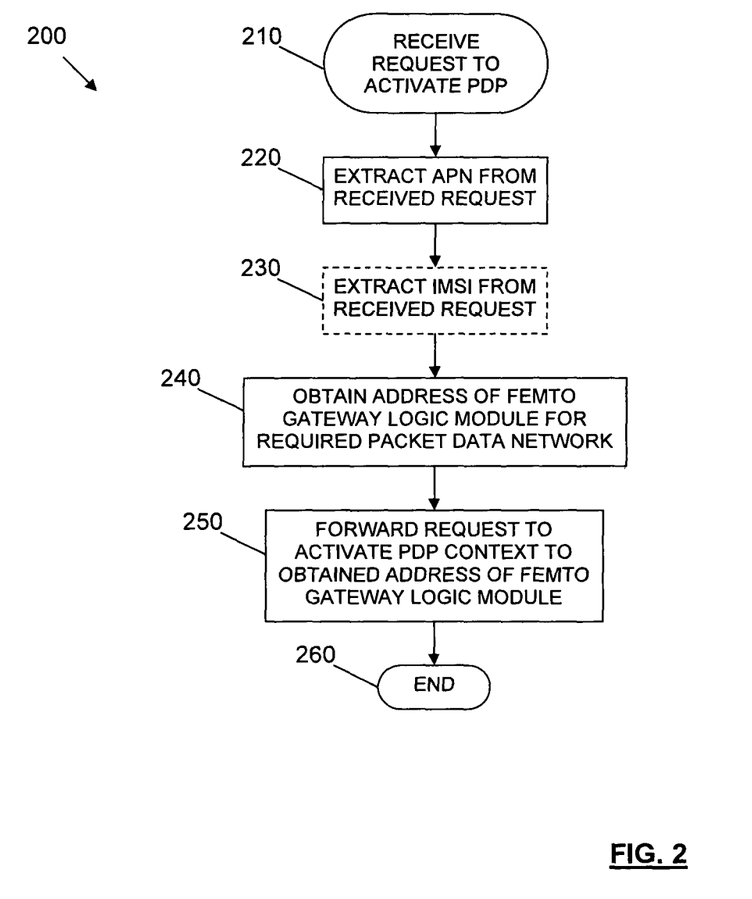
FIG. 2 illustrates an example of a simplified flowchart of a method for enabling a mobile communication device to access a packet data network according to an embodiment of the invention.

Referring now to FIG. 2, there is illustrated an example of a simplified flowchart 200 of a method for enabling a mobile communication device to access a packet data network according to some embodiments of the invention. The method starts at step 210 with the receipt of a request to create a packet data context. Next, in step 220, an APN is extracted from the received request, where the APN at least comprises an indication of the packet data network for which access is required.

In accordance with some embodiments of the invention, the method may then optionally move on to step 230, for example if the received request to create a packet data context comprises a generic or common APN. In step 230, an identifier for a wireless communication device requesting the packet data context, such as the IMSI for the wireless communication device, is extracted from the received request. The method then moves on to step 240. Alternatively, the method may move directly from step 220 to 240, for example if the received request to activate a packet data context comprises an APN that is substantially unique to the required gateway logic module.

In step 240, an address of a femto gateway logic module for the required packet data network is obtained, for example by way of a DNS lookup operation or from a database. Next, in step 250, the request to create a packet data context is forwarded to the address obtained in step 240. The method then ends at step 260.

It is envisaged that the aforementioned embodiments may provide one or more of the following advantages:

(i) the gateway router logic 182 may be able to act as an intermediary between, say, a serving support node such as an SGSN and one or more gateway logic modules the gateway router logic 182 may alleviate the need for the serving support node to support significantly large numbers of gateway interfaces for packet data networks, and for the serving support node to communicate directly with femto access points;

(ii) the gateway router logic 182 may further alleviate the need to provide conventional serving support nodes with sufficient information to enable them to identify specific gateway interfaces from requests to activate packet data contexts; and (iii) the implementation of gateway interface functionality within femto APs, in order to improve the efficiency of accessing the Internet and other packet data networks via femto cells, may be facilitated. In particular, the gateway router logic 182 may alleviate the need for significant alterations of, or changes to, conventional SGSNs and other conventional network elements.

Figure 3:
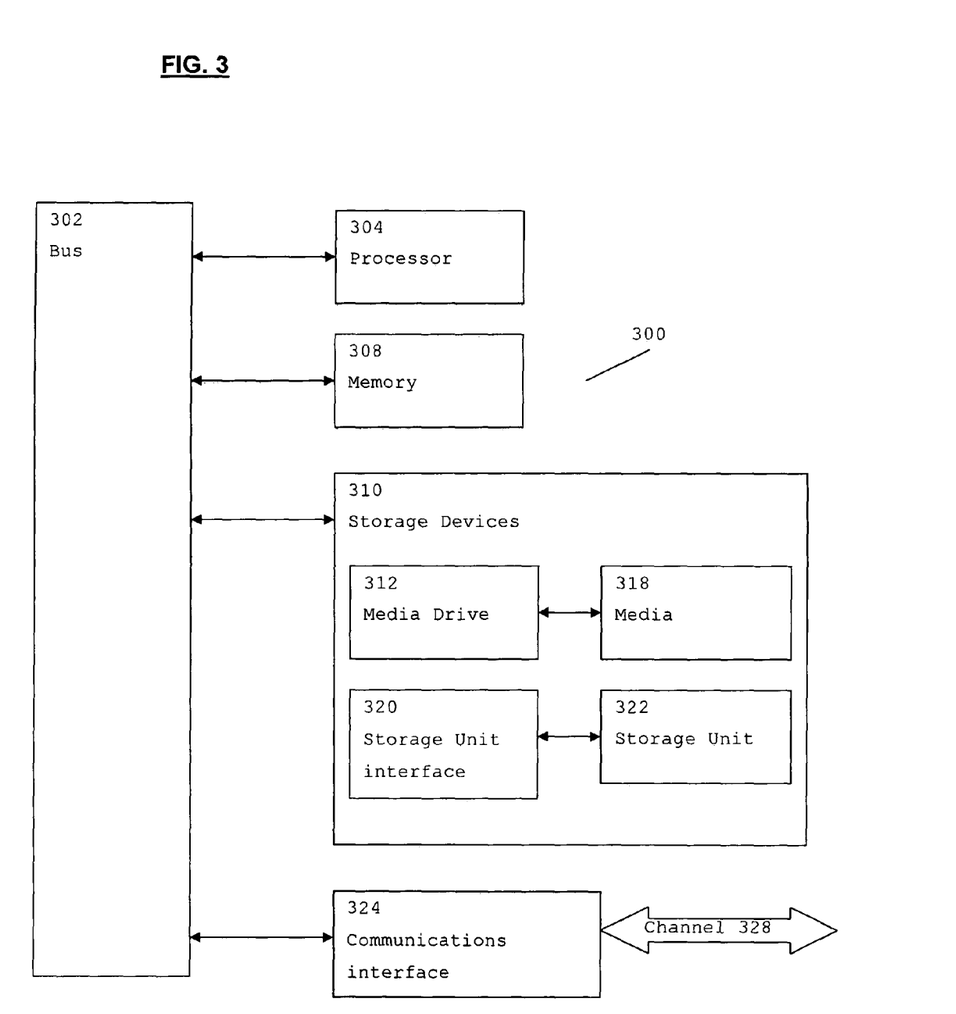
FIG. 3 illustrates a typical computing system that may be employed to implement signal processing functionality in embodiments of the invention.

Referring now to FIG. 3, there is illustrated a typical computing system 300 that may be employed to implement signal processing functionality in embodiments of the invention. Computing systems of this type may be used in network elements, access points and wireless communication units. Those skilled in the relevant art will also recognize how to implement the invention using other computer systems or architectures. Computing system 300 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 300 can include one or more processors, such as a processor 304. Processor 304 can be implemented using a general or special-purpose processing engine such as, for example, a microprocessor, microcontroller or other control logic. In this example, processor 304 is connected to a bus 302 or other communications medium.

Computing system 300 can also include a main memory 308, such as random access memory (RAM) or other dynamic memory, for storing information and instructions to be executed by processor 304. Main memory 308 also may be used for storing temporary variables or other intermediate information during execution of instructions to be executed by processor 304. Computing system 300 may likewise include a read only memory (ROM) or other static storage device coupled to bus 302 for storing static information and instructions for processor 304.

The computing system 300 may also include information storage system 310, which may include, for example, a media drive 312 and a removable storage interface 320. The media drive 312 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 318 may include, for example, a hard disk, floppy disk, magnetic tape, optical disk, CD or DVD, or other fixed or removable medium that is read by and written to by media drive 312. As these examples illustrate, the storage media 318 may include a computer-readable storage medium having particular computer software or data stored therein.

In alternative embodiments, information storage system 310 may include other similar components for allowing computer programs or other instructions or data to be loaded into computing system 300. Such components may include, for example, a removable storage unit 322 and an interface 320, such as a program cartridge and cartridge interface, a removable memory (for example, a flash memory or other removable memory module) and memory slot, and other removable storage units 322 and interfaces 320 that allow software and data to be transferred from the removable storage unit 322 to computing system 300.

Computing system 300 can also include a communications interface 324. Communications interface 324 can be used to allow software and data to be transferred between computing system 300 and external devices. Examples of communications interface 324 can include a modem, a network interface (such as an Ethernet or other NIC card), a communications port (such as for example, a universal serial bus (USB) port), a PCMCIA slot and card, etc. Software and data transferred via communications interface 324 are in the form of signals which can be electronic, electromagnetic, and optical or other signals capable of being received by communications interface 324. These signals are provided to communications interface 324 via a channel 328. This channel 328 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 308, storage device 318, or storage unit 322. These and other forms of computer-readable media may store one or more instructions for use by processor 304, to cause the processor to perform specified operations. Such instructions, generally referred to as 'computer program code' (which may be grouped in the form of computer programs or other groupings), when executed, enable the computing system 300 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 300 using, for example, removable storage unit 322, drive 312 or communications interface 324. The control logic (in this example, software instructions or computer program code), when executed by the processor 304, causes the processor 304 to perform the functions of the invention as described herein.

It will be appreciated that, for clarity purposes, the above description has described embodiments of the invention with reference to different functional elements and processors. However, it will be apparent that any suitable distribution of functionality between different functional elements or processors, for example with respect to a base station or controller, may be used without detracting from the invention. For example, it is envisaged that functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these: The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Although one embodiment of the invention describes an AP for a UMTS network, it is envisaged that the inventive concept is not restricted to this embodiment.

Although the invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Moreover, an embodiment can be implemented as a computer-readable storage element having computer readable code stored thereon for programming a computer (e.g., comprising a signal processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second' etc. do not preclude a plurality.

Thus, a method and apparatus for enabling a mobile communication device to access a packet data network have been described, which aims to substantially address at least some of the shortcomings of past and present techniques and/or mechanisms for enabling a mobile communication device to access a packet data network.

The invention claimed is:

1. A network element for a cellular communication network, the network element comprising a gateway router logic module arranged to:
   receive a request from a serving support node of the cellular communication network to create a packet data context for enabling a mobile communication device to access a packet data network;
   obtain an address for a gateway logic module which is located within a femto radio network subsystem (RNS) from information provided in the request to create a packet data context;
   forward the request to create a packet data context to the obtained address for the gateway logic module and route subsequently received signalling and data associated with the request to create a packet data context between the serving support node and the gateway logic module.

2. The network element of claim 1 wherein the gateway router logic module is arranged to obtain the address for the gateway logic module using a unique access point name for the gateway logic module that is provided within the request to create a packet data context.

3. The network element of claim 1 wherein the gateway router logic module is arranged to obtain the address for the gateway logic module using an identifier for the mobile communication device that is provided within the request to create a packet data context.

4. The network element of claim 1 wherein, if the mobile communication device is accessing the cellular communication network via a femto access point, the gateway router logic module is arranged to create a direct tunnel between an air interface controller and the gateway logic module of the femto RNS.

5. The network element of claim 1 wherein the packet data network comprises at least one of the Internet and a local area network.

6. The network element of any claim 1, wherein the gateway logic module is located within a femto access point.

7. The network element of claim 6 wherein the gateway router logic module is operably coupled to a security gateway via which the gateway router logic module is able to transmit and receive signalling and data to and from at least one femto access point.

8. The network element of claim 1 wherein the gateway logic module is located within a femto access controller.

9. A cellular communication network comprising a gateway router logic module arranged to:
   receive a request from a serving support node of the cellular communication network to create a packet data context for enabling a mobile communication device to access a packet data network;
   obtain an address for a gateway logic module which is located within a femto radio network subsystem (RNS) from information provided in the request to create a packet data context;
   forward the request to create a packet data context to the obtained address for the gateway logic module, and route subsequently received signalling and data associated with the request to create a packet data context between the serving support node and the gateway logic module.

10. The cellular communication network of claim 9 wherein the serving support node is arranged, upon receipt of a request from the mobile communication device to access the packet data network, to generate the request to create a packet data context intended for receipt by the gateway logic module;

wherein the serving support node is caused to send the request to create a packet data context to the gateway router logic module of the network element.

11. The cellular communication network of claim 9 wherein the gateway router logic module is arranged to obtain the address for the gateway logic module using at least one from the group consisting of: a unique access point name for the gateway logic module that is provided within the request to create packet data context; and an identifier in mobile communication device that is provided within the request to create a packet data context.

12. The cellular communication network of claim 9 wherein if the mobile communication device is accessing the cellular communication network via a femto access point, the gateway router logic module is arranged to create a direct tunnel between an air interface controller and the gateway logic module of the femto RNS.

13. A method for enabling a mobile communication device to access a packet data network, the method comprising:
   receiving a request from a serving support node of the cellular communication network to create a packet data context for enabling a mobile communication device to access the packet data network;
   obtaining an address for a gateway logic module which is located within a femto radio network subsystem (RNS) from information provided in the request to create a packet data context;
   forwarding the request to create a packet data context to the obtained address for the gateway logic module, and routing subsequently received signalling and data associated with the request to create a packet data context between the serving support node and the gateway logic module.

14. The method of claim 13 wherein obtaining the address for the gateway logic module comprise at least one step from the group consisting of: using a unique access point name for the gateway logic module that was provided within the request to create a packet data context; and using an identifier for the mobile communication device that is provided within the request to create a packet data context.

15. The method of claim 13, wherein, if the mobile communication device is accessing the cellular communication network via a femto access point, the method further comprises creating a direct tunnel between an air interface controller and the gateway logic module of the femto (RNS).

16. The method of claim 13 wherein the gateway logic module is located within a femto access point.

17. A non-transitory computer-readable medium having computer-readable instructions stored therein for execution by a processor to perform a method for enabling a mobile communication device to access a packet data network, the method comprising, when executed at a network element,
   receiving a request from a serving support node of the cellular communications network to create a packet data context for enabling the mobile communication device to access the packet data network;
   obtaining an address for a gateway logic module which is located within a femto radio network subsystem from information provided in the request to create a packet data context;
   forwarding the request to create a packet data context to the obtained address for the gateway logic module, and routing subsequently received signalling and data associated with the request to create a packet data context between the serving support node and the gateway logic module.

18. The non-transitory computer-readable medium of claim 17, wherein the non-transitory computer-readable medium comprises at least one of the group consisting of: a hard disk, a CD-ROM, an optical storage device, a magnetic storage device, a Read Only Memory, ROM, a Programmable Read Only Memory, PROM, an Erasable Programmable Read Only Memory, EPROM, an Electrically Erasable Programmable Read Only Memory, EEPROM, and a Flash memory.

\* \* \* \* \*

UNITED STATES PATENT AND TRADEMARK OFFICE
CERTIFICATE OF CORRECTION

| | | |
|---|---|---|
| PATENT NO. | : 8,934,409 B2 | Page 1 of 1 |
| APPLICATION NO. | : 13/145587 | |
| DATED | : January 13, 2015 | |
| INVENTOR(S) | : David Neil | |

It is certified that error appears in the above-identified patent and that said Letters Patent is hereby corrected as shown below:

ON THE TITLE PAGE:

Item (73) -- Change "IP.Access Limted, Cambrideshire" to -- IP.Access Limited, Cambridgeshire --; and

IN THE CLAIMS:

Claim 6, Column 16, Line 37 -- Change "of any" to -- of --.

Signed and Sealed this
Fourteenth Day of June, 2016

Michelle K. Lee
*Director of the United States Patent and Trademark Office*